A. E. BOSSÉ.
CHECK OR SAFETY VALVE.
APPLICATION FILED SEPT. 14, 1909.
1,021,758.
Patented Apr. 2, 1912.
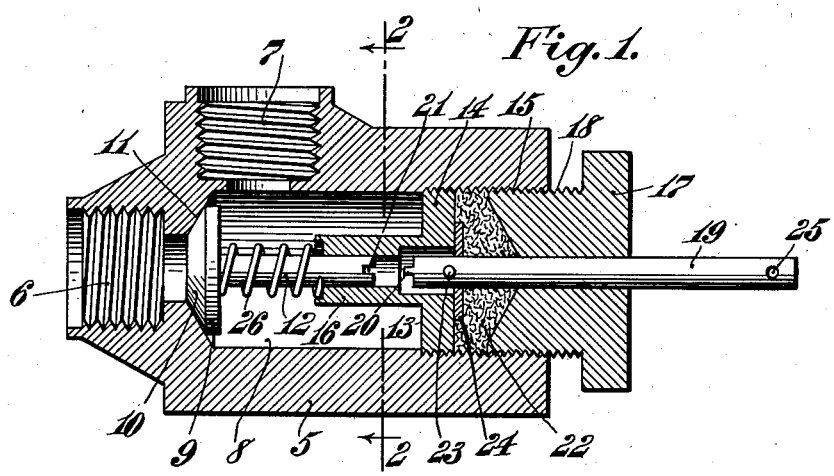
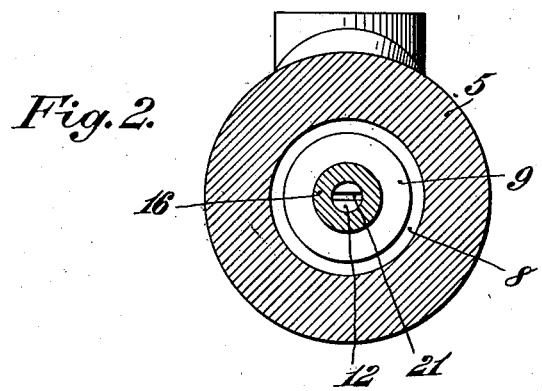
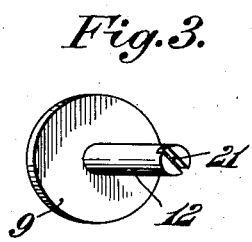
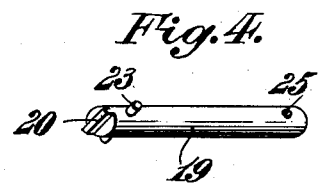
Witnesses
Ethel H. Roberts
Mae Hofmann
Inventor
Adolph E. Bossé,
By Jas. C. Wohnsmith
Attorney

UNITED STATES PATENT OFFICE.

ADOLPH E. BOSSÉ, OF PITTSBURGH, PENNSYLVANIA, ASSIGNOR TO ACME REFRIGERATING COMPANY, A CORPORATION OF DELAWARE.

CHECK OR SAFETY VALVE.

1,021,758.  Specification of Letters Patent.  Patented Apr. 2, 1912.

Application filed September 14, 1909. Serial No. 517,550.

*To all whom it may concern:*

Be it known that I, ADOLPH E. BOSSÉ, a citizen of the United States, residing at Pittsburgh, in the county of Allegheny and State of Pennsylvania, have invented certain new and useful Improvements in Check or Safety Valves, of which the following is a specification.

My invention relates to check or safety valves, and in such connection it has particular relation to a check or safety valve which may be readily cleared or reground while in service without being dismantled, to the end that the operation of the apparatus with which the valve is used will not be interfered with, except in a minimum degree, whenever it is necessary to clean or regrind the valve.

My invention finds a valuable application in connection with the ammonia systems of refrigeration plants.

The object, therefore, of my invention is to provide a simple, durable and efficient valve construction for the purpose as aforesaid.

The nature and characteristic features of my invention will be more readily understood from the following description taken in connection with the accompanying drawings forming part hereof, in which, Figure 1 is a longitudinal, central section of a valve structure embodying the main features of my invention; Fig. 2 is a transverse section taken on the line 2—2 of Fig. 1; Fig. 3 is a perspective view of the valve disk and its stem; and Fig. 4 is a similar view of a valve disk turning rod, constituting one of the principal elements of my present invention.

Referring to the drawings, 5 is a cylindrical casing, having a threaded inlet 6 at one end thereof and a threaded outlet 7 extending from the side in communication with the interior valve chamber 8.

9 is the valve disk having a conical seating surface 10, which rests on the valve seat 11, and normally closes the communication between the threaded inlet 7 and the valve chamber 8. Extending rearwardly from the valve disk 9 is a cylindrical valve stem 12 which is guided and supported at its outer end in a guiding member 13, which consists of a disk-like portion 14 having its outer periphery in threaded engagement with the complemental threads 15 at the rear portion of the valve casing 5 and a sleeve 16 forming the guide proper for the valve stem 12, which sleeve extends forwardly from the disk 14, as clearly shown in Fig. 1 of the drawings. A stuffing box gland 17, having exterior threads 18, is also screwed into the threads 15 at the rear portion of the valve casing 5. Loosely mounted in the stuffing box gland 17, so as to be freely slidable and turnable therein, is a cylindrical rod 19, the inner end of which extends into the interior of the sleeve of the valve stem guiding and supporting sleeve 16, and is provided at its inner end with a transverse projection 20, which is adapted to engage a slot 21 in the outer end of the valve stem 12. Suitable packing 22 is interposed between the inner surface of the gland 17 and the disk 14 of the valve stem supporting member, to prevent leakage of the fluid from the valve chamber 8 past the rod 19. Near the inner end of the rod 19 there is secured a pin 23 which extends downwardly from both sides of said rod and normally bears against a washer 24 arranged in the rear of the disk 14, forming a stop to prevent the rod 19 from being forced through the stuffing box under the pressure of the fluid in the valve chamber 8. The exterior end of the rod 19 may be provided with an aperture 25 for securing the same to any suitable form of actuating device, such as a transverse pin, or if desired a crank may be secured to the outer end of the rod 19. The valve disk 9 is normally held on its seat by means of a helical spring 26 which surrounds the valve stem 12 and bears at one end against the disk 9, and at its other end against the inner end of the valve stem supporting sleeve 16.

It will of course be understood that the spring 26 may be of any desired strength for the particular purpose or use of the valve, either as a check or safety valve as the case may be. It will also be seen that if desired the valve stem supporting member may be caused to occupy various positions within the valve casing 5 to thereby vary the strength of any given spring which may be used.

In the normal operation of the valve, the inner end of the rod 19 is maintained in its normal retracted position by the pressure of the fluid within the valve chamber 8, so that no interference with the valve stem 12 will take place, and the valve disk 9 will at all times be free to act without interference from the turning rod 19. If, however, the valve should leak, either on account of extraneous material getting between the faces of the valve disk and its seat, or on account of imperfections in the co-acting surfaces, the rod 19 may be pushed inwardly through the stuffing box until its projection 20 will engage in the slot 21 at the end of the valve stem 12, and the valve disk 9 may then be readily rotated to regrind the surfaces and free any foreign matter which may become lodged therebetween.

Having thus described the nature and characteristic features of my invention, what I claim as new and desire to secure by Letters Patent is:

In a device of the character described, the combination of a valve casing having an interior valve seat, a valve disk normally resting on said seat, a stem extending rearwardly from said valve disk, a member within which the valve stem is supported and guided, said member being threaded in the valve casing, a gland threaded in the valve casing behind said valve stem supporting member and packing interposed between said gland and member to form a stuffing box, and a rod extending through said stuffing box and adapted to engage the valve stem to thereby provide means extending exteriorly for arbitrarily rotating the valve on its seat, said rod being freely slidable and rotatable in said stuffing box.

In testimony whereof, I have hereunto affixed my signature in the presence of two witnesses.

ADOLPH E. BOSSÉ.

Witnesses:
 SARA EWING,
 MABEL E. FERRELL.